(12) United States Patent
Duffield et al.

(10) Patent No.: US 7,840,942 B2
(45) Date of Patent: Nov. 23, 2010

(54) CONFIGURATION FILE SHARING

(75) Inventors: Dana M. Duffield, Rochester, MN (US);
Matthew G. Kelm, Rochester, MN (US); Mark J. Luchini, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1029 days.

(21) Appl. No.: 11/564,327

(22) Filed: Nov. 29, 2006

(65) Prior Publication Data

US 2008/0127164 A1 May 29, 2008

(51) Int. Cl.
*G06F 9/44* (2006.01)
(52) U.S. Cl. ....................... 717/121; 717/164
(58) Field of Classification Search .................. 717/121, 717/164
See application file for complete search history.

(56) References Cited

U.S. PATENT DOCUMENTS

| 5,867,714 | A  | * | 2/1999 | Todd et al. ................... 717/172 |
| 6,301,710 | B1 | * | 10/2001 | Fujiwara ...................... 717/175 |
| 6,425,125 | B1 | * | 7/2002 | Fries et al. ................... 717/168 |
| 6,622,067 | B1 | * | 9/2003 | Lovelace et al. .............. 701/19 |
| 2002/0066085 | A1 | * | 5/2002 | Nowlin, Jr. et al. ......... 717/137 |
| 2002/0124243 | A1 | * | 9/2002 | Broeksteeg et al. ......... 717/168 |

* cited by examiner

*Primary Examiner*—Thomas K Pham
(74) *Attorney, Agent, or Firm*—Dillon & Yudell LLP

(57) ABSTRACT

A method, system and computer-readable medium for configuration file sharing are presented. In a preferred embodiment, the method includes the steps of: creating, in a controller, a superset registry file that includes old registry data, new registry data, and kindred registry data, wherein the old registry data and the new registry data are incompatible, and wherein the kindred registry data is compatible with both the old registry data and the new registry data; and contemporaneously downloading the kindred registry data and software version-specific registry data, selected from the old registry data and the new registry data, to a requesting client.

20 Claims, 11 Drawing Sheets

```
                    WAS.xml    (version x+5)
...
(repertoire ... provider="IBMJSSE".>
    <properties xmi:id="Property_11513491330561" name="com.ibm.ssl.protocol"value=SSLv3"/>
</setting>
<FTO from="x+4"to="x+5">...</FTO>
<FTO from="x+3"to="x+4">...</FTO>
<objectSlush from="x+2" to="x+3">...</FTO>
<objectSlush from="x+1" to="x+2">...</FTO>
<objectSlush from="x" to="x+1">...</FTO>
</repertoire>
...
```

FIG. 7

CONFIGURATION FILE SHARING

BACKGROUND OF THE INVENTION

1. Technical Field

The present invention relates in general to the field of data processing, and, in particular, to software. Still more particularly, the present invention relates to managing configuration files used by software.

2. Description of the Related Art

While components of computer software can be categorized in many ways, a useful concept, when describing the present invention, is to consider software (including both operating systems as well as application programs) as being composed of instructions and configuration files. As the name implies, instructions are lines of code that "tell" (instruct) a computer how to manipulate data. Examples of such instructions are "add," "subtract," "compare," etc. By utilizing many such instructions in a logical manner, a computer can perform complex operations, including database management, word processing, graphic design, telecommunication, etc.

While instructions tell a computer how to function, a configuration file tells the instructions what parameters to use. Examples of such parameters include file names used for various software components, page lengths, fonts used by the software, (if the software is an application) what operating system is to be used, etc. There are literally hundreds of parameters that are described and controlled by the entries in the configuration file.

Different operating systems name and utilize their configuration files differently. For example, Unix® user applications often create a configuration file in a home directory of the user upon startup. Unix® server processes often use configuration files in an installation directory, a root directory, or a location defined by a system administrator. Furthermore, some Unix® configuration files run a set of commands upon startup, such as commands to change directories, run certain programs, create or delete certain files, etc., in order to customize the Unix® session.

Microsoft® Windows® operating systems typically use a Windows® registry to store configuration information. The Windows® registry is a database that contains information and settings for hardware, software, users, and preferences of a computer that is running Window®. For example, whenever a user makes changes to "Control Panel" settings, or file associations, system policies, or installed software, the changes are reflected and stored in the registry.

IBM's® OS/2® operating system uses a binary formatted registry file named INI (for "initialization"). Unlike the Window® registry, the OS/2® profile (registry) contains a list of key-value pairs, which describe string, data and Boolean operative properties.

Although technically different in some ways, for the purposes of the presently described invention, the terms "registry," "registry file," "configuration file," and "profile" are used interchangeably to describe a configuration file.

Software packages, which include instructions and registry files, can be upgraded. Therefore, just as the instructions in the software package can be upgraded, so too can the registry files in the software package be upgraded. Registry files for a software package may be upgraded for a current version of software instructions used by that software package; or, more commonly, the registry files may be upgraded when the software instructions are upgraded for a newer version of the software package. For example, FIG. 1A depicts an old version software package 106a being upgraded to a new version software package 106b. During this upgrade, the respective registry files are also upgraded, as shown by an old registry file 108a being upgraded (by migration) to a new registry file 108b. As depicted in FIG. 1A, both the old version software package 106a and the new version software package 106b are stored in a server 102 (e.g., an IBM Websphere® server), which supports at least one client 104. When client 104 requests a copy of a software package, it is typically presented with the latest version of the requested software package (e.g., new version software package 106b). Thus, new registry file 108b is downloaded, as part of the new version software package 106b, to the requesting client 104.

However, there are circumstances in which the client 104 prefers to receive the old version software package 106a. As depicted in FIG. 1B, the server 102 can, responsive to the request from the client 104, download the old version software package 106a to the client 104. The old registry file 108a only contains old registry data, even though new registry file 108b may contain data that could be used by, and useful to, the old version software package 106a that is downloaded to the client 104. However, since the old registry file 108a is a static "snapshot" of data that existed before the upgrade described in FIG. 1A, such changes to the registry file are unavailable to the client 104 that downloads the old version software package 106a.

Consider now exemplary pseudocode shown in FIG. 1C, which describes the scenario shown in FIGS. 1A-B. Version 5 of software named "WAS.xml" uses a registry data called "keyFileName." In Version 6 of this software, however, the term "keyFileName" is replaced with the term "provider." This one time conversion disposes of data that has no significance to the destination version (Version 6), while destructively mutating data such that it is unusable by the source version (Version 5). Thus, the translation is irreversible.

SUMMARY OF THE INVENTION

To address the problems described above, the present invention presents a method, system and computer-readable medium for configuration file sharing. In a preferred embodiment, the method includes the steps of: creating, in a controller, a superset registry file that includes a Flexible Transformation Object (FTO), the superset registry file including old registry data, new registry data, and kindred registry data, wherein the old registry data and the new registry data are incompatible, and wherein the kindred registry data is compatible with both the old registry data and the new registry data; and contemporaneously downloading the kindred registry data and software version-specific registry data, selected from the old registry data and the new registry data, to a requesting client.

The above, as well as additional, purposes, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further purposes and advantages thereof, will best be understood by reference to the following detailed description of an illustrative embodiment when read in conjunction with the accompanying drawings, where:

FIG. 7 illustrates exemplary pseudocode used to clean up code such that only recent versions of registry data are supported by the software deploying server shown in FIG. 2.

DETAILED DESCRIPTION OF THE PREFERRED EMBODIMENT

Figure 2:
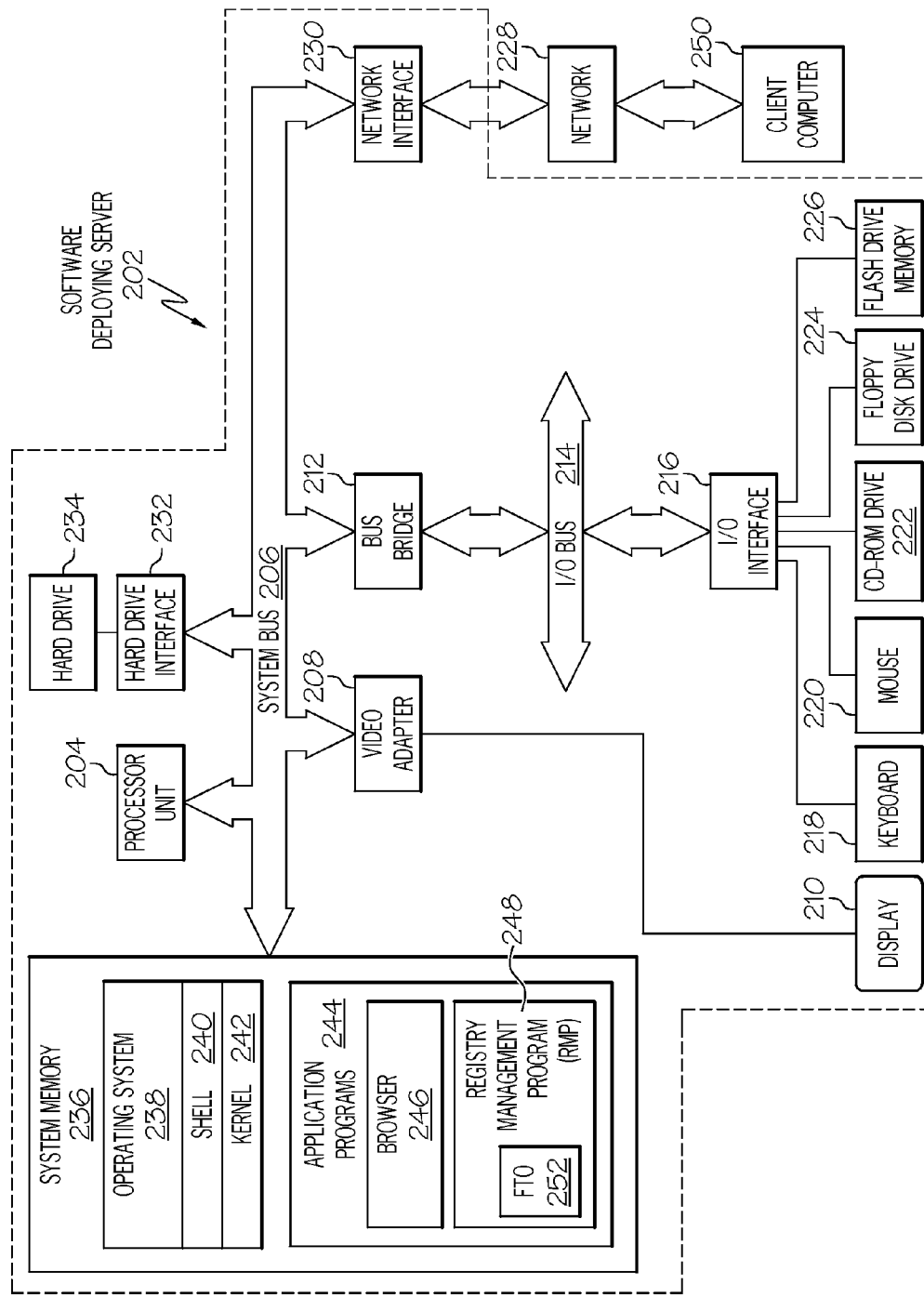
FIG. 2 illustrates an exemplary software deploying server in which the present invention may be utilized.

With reference now to FIG. 2, there is depicted a block diagram of an exemplary software deploying server 202, in which the present invention may be utilized. Software deploying server 202 includes a processor unit 204 that is coupled to a system bus 206. A video adapter 208, which drives/supports a display 210, is also coupled to system bus 206. System bus 206 is coupled via a bus bridge 212 to an Input/Output (I/O) bus 214. An I/O interface 216 is coupled to I/O bus 214. I/O interface 216 affords communication with various I/O devices, including a keyboard 218, a mouse 220, a Compact Disk—Read Only Memory (CD-ROM) drive 222, a floppy disk drive 224, and a flash drive memory 226. The format of the ports connected to I/O interface 216 may be any known to those skilled in the art of computer architecture, including but not limited to Universal Serial Bus (USB) ports.

Software deploying server 202 is able to communicate with a client computer 250 via a network 228 using a network interface 230, which is coupled to system bus 206. Network 228 may be an external network such as the Internet, or an internal network such as an Ethernet or a Virtual Private Network (VPN).

A hard drive interface 232 is also coupled to system bus 206. Hard drive interface 232 interfaces with a hard drive 234. In a preferred embodiment, hard drive 234 populates a system memory 236, which is also coupled to system bus 206. System memory is defined as a lowest level of volatile memory in software deploying server 202. This volatile memory includes additional higher levels of volatile memory (not shown), including, but not limited to, cache memory, registers and buffers. Data that populates system memory 236 includes software deploying server 202's operating system (OS) 238 and application programs 244.

OS 238 includes a shell 240, for providing transparent user access to resources such as application programs 244. Generally, shell 240 is a program that provides an interpreter and an interface between the user and the operating system. More specifically, shell 240 executes commands that are entered into a command line user interface or from a file. Thus, shell 240 (as it is called in UNIX®), also called a command processor in Windows®, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 242) for processing. Note that while shell 240 is a text-based, line-oriented user interface, the present invention will equally well support other user interface modes, such as graphical, voice, gestural, etc.

As depicted, OS 238 also includes kernel 242, which includes lower levels of functionality for OS 238, including providing essential services required by other parts of OS 238 and application programs 244, including memory management, process and task management, disk management, and mouse and keyboard management.

Application programs 244 include a browser 246. Browser 246 includes program modules and instructions enabling a World Wide Web (WWW) client (i.e., software deploying server 202) to send and receive network messages to the Internet using HyperText Transfer Protocol (HTTP) messaging, thus enabling communication with client computer 250. In one embodiment of the present invention, client computer 250 may utilize a same or substantially similar architecture as shown and described for software deploying server 202.

Also stored with system memory 236 is a Registry Management Program (RMP) 248, which includes some or all software code needed to perform the steps described in FIG. 3A to FIG. 7. Preferably, various Flexible Transformation Objects (FTO) 252, described in greater detail below, are stored in system memory 236 with, or are at least accessible to, RMP 248, which is a controller that manages configuration data in software. RMP 248 may be deployed from software deploying server 202 to client computer 250 in any automatic or requested manner, including being deployed to client computer 250 in an on-demand basis. Similarly, RMP 248 may be deployed to software deploying server 202 from another software deploying server (not shown).

The hardware elements depicted in software deploying server 202 are not intended to be exhaustive, but rather are representative to highlight essential components required by the present invention. For instance, software deploying server 202 may include alternate memory storage devices such as magnetic cassettes, Digital Versatile Disks (DVDs), Bernoulli cartridges, and the like. These and other variations are intended to be within the spirit and scope of the present invention.

Figure 3A:
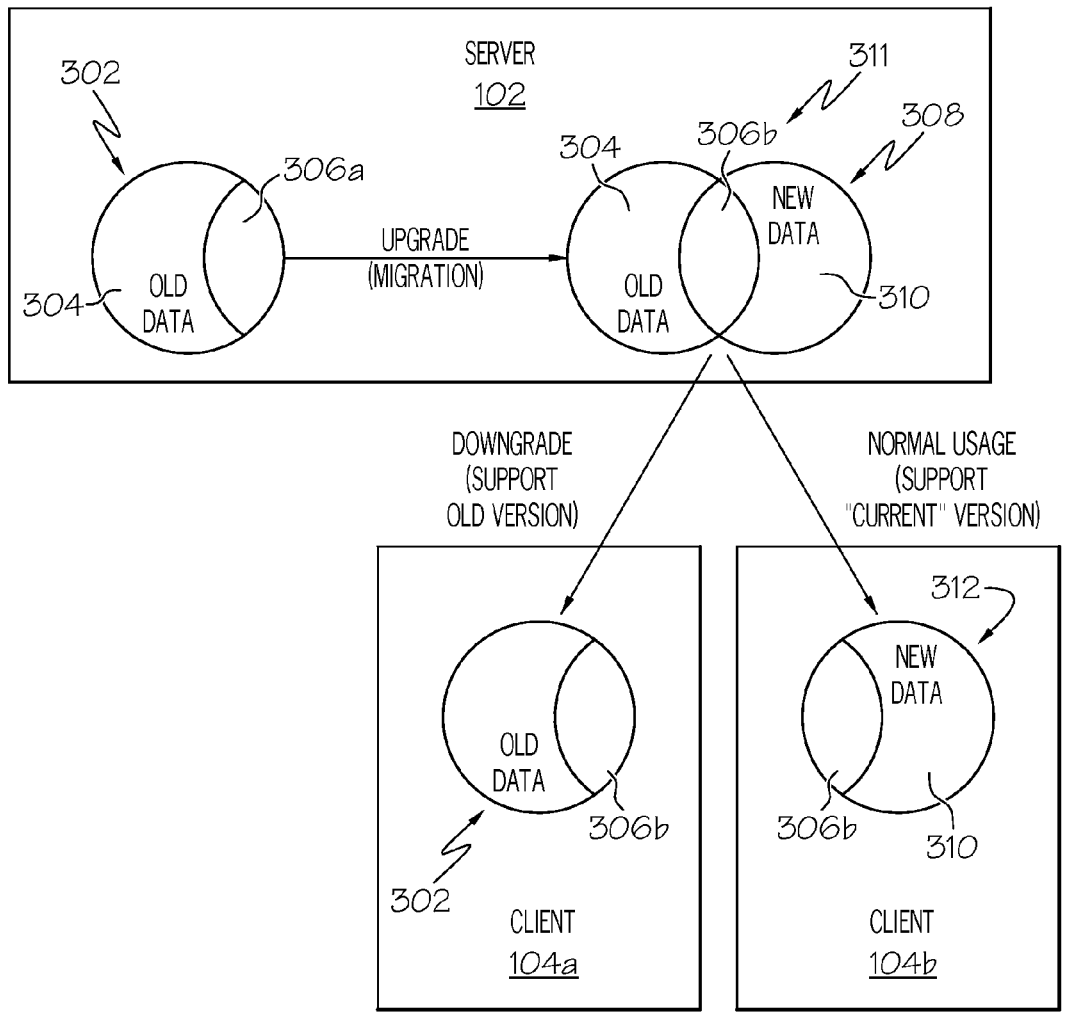
FIGS. 3A-B depict an inventive Flexible Transformation Object (FTO) that includes old registry data, new registry data, and kindred registry data.

With reference now to FIG. 3A, a graphical representation of an exemplary Flexible Transformation Object (FTO) 308, which in one embodiment resides in a server 102 (such as IBM's Websphere® Application Server) is presented. FTO 308 is a method object that embeds instructions, for an "intelligent translator," into a configuration document. In a preferred embodiment, FTO 308 is embedded in a superset registry file 311, which includes old registry data 304, new registry data 310, and kindred registry data 306b. That is, the FTO 308 is embedded in the configuration document referenced as superset registry file 311, which is part of a larger piece of software known as a "controller." The controller is software that is responsible for managing configuration data, either for itself or for other software. Thus, the superset registry file 311 includes information depicted by the overlapping circles that depict old registry data 304, new registry data 310, and kindred registry data 306b (where kindred registry data 306b is the same data 306a shown as part of old registry file 302). FTO 308 is the information used by the intelligent translator to turn the superset registry file 311 into a single complete file that contains either only old and kindred data (as shown in Client 104a) or only new and kindred data (as shown in Client 104b), where the kindred data is preferably in a version appropriate format.

Figure 1A:
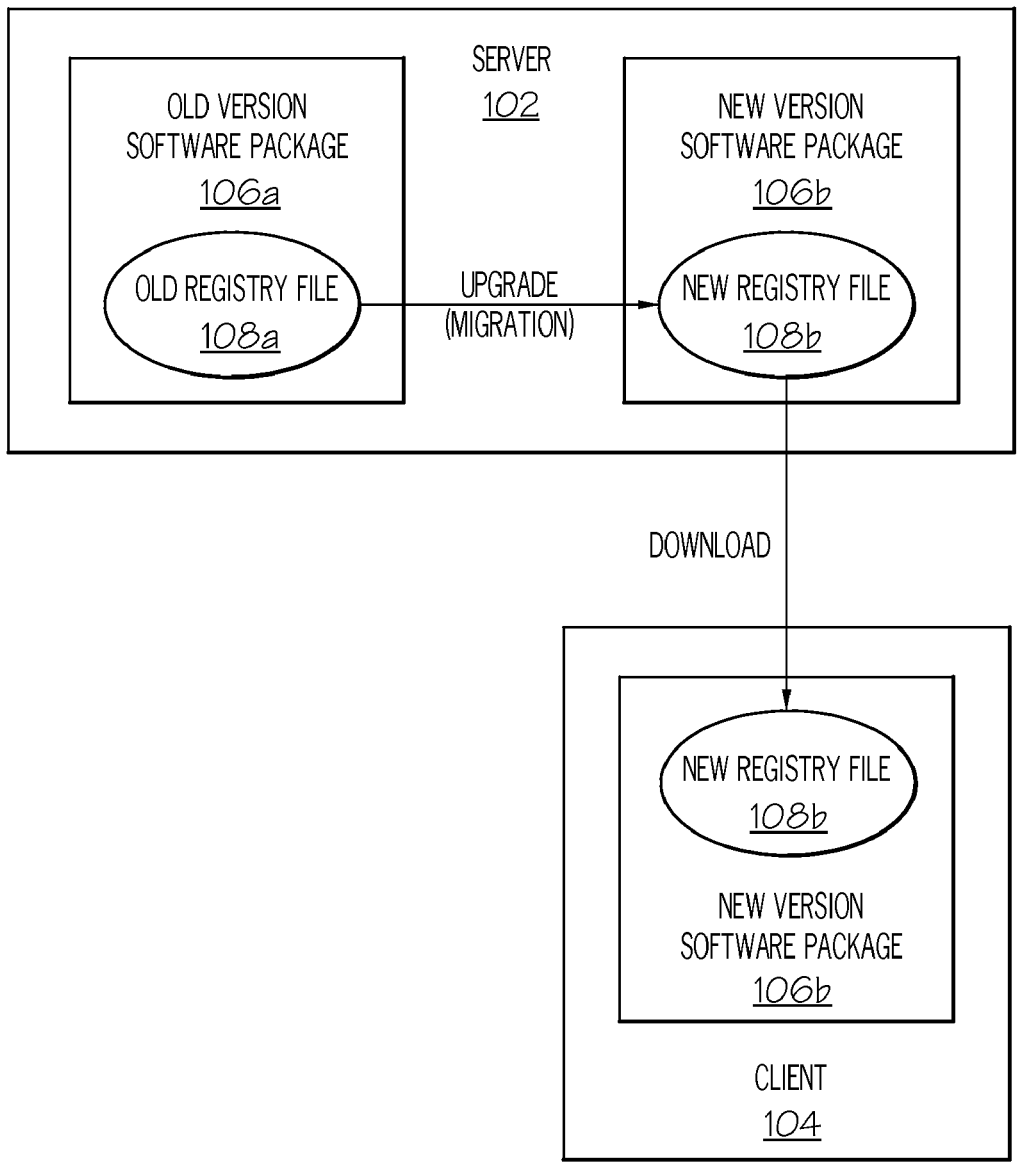
FIGS. 1A-C depict a prior art method of upgrading registry files.
Figure 1B:
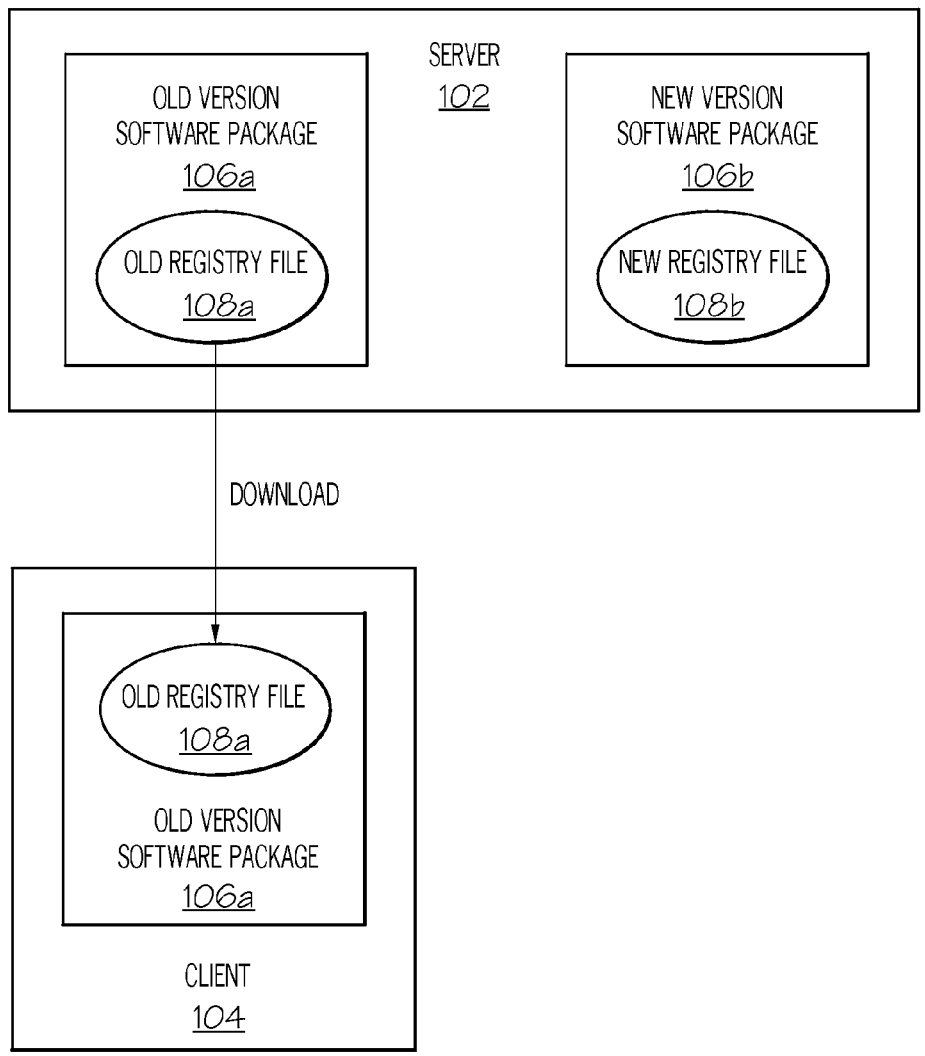
Figure 1C:
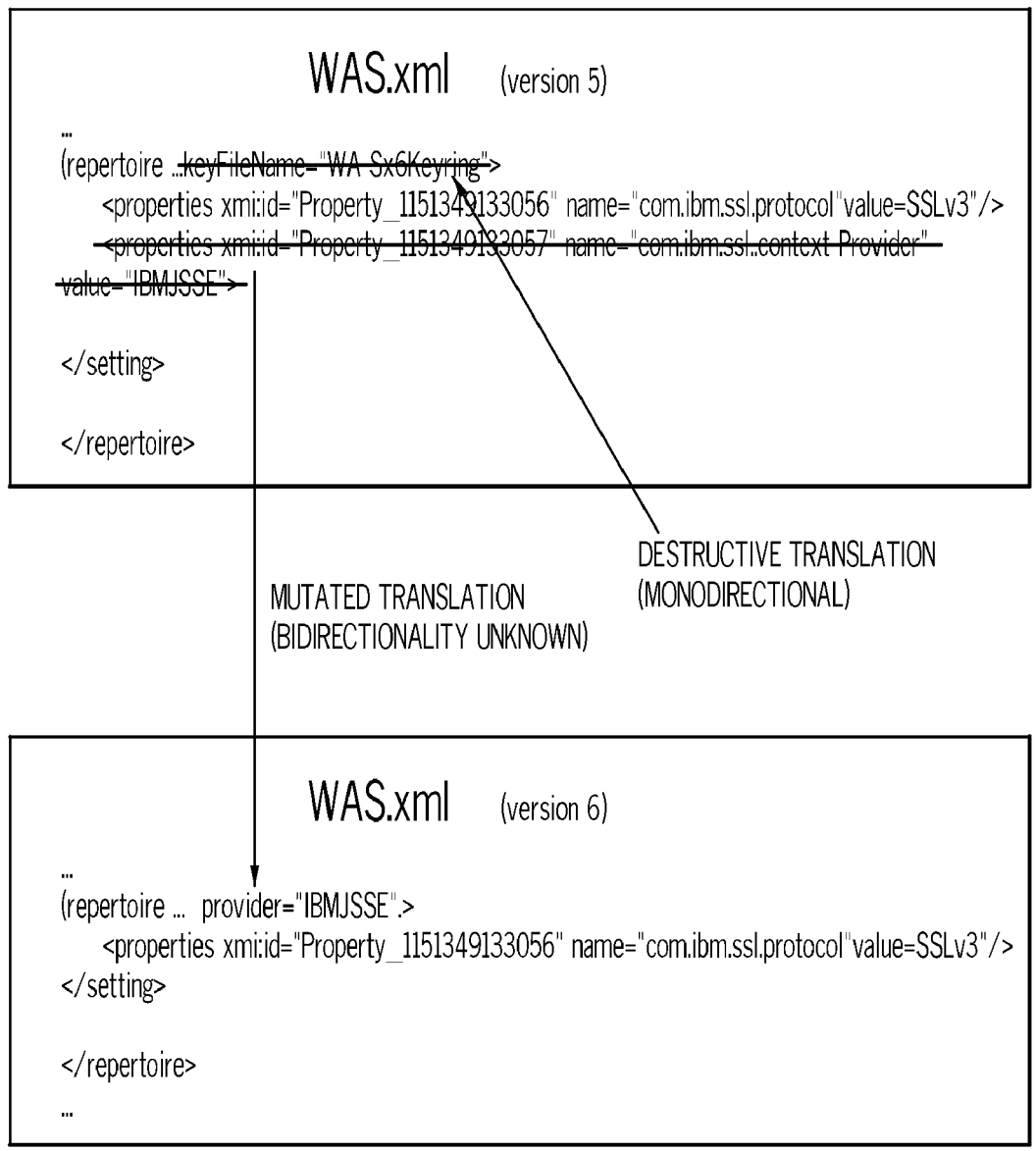

When an old registry file 302 (used to support an old version software package, such as that described above and depicted in FIG. 1A, but for clarity's sake not re-illustrated in FIG. 3A) is upgraded (by migration), old registry data 304 from the old registry file 302 becomes part of superset registry file 311. The superset registry file 311 also includes new registry data 310 that supports a new version software package (also not shown). Note that superset registry file 311 is not usable in whole by a client computer 104, since old registry data 304 and new registry data 310 are incompatible. In a preferred embodiment, the term "incompatible" is defined as meaning that old registry data 304 cannot be used to support a new version software package, and new registry data 310 cannot be used to support an old version software package. The reasons why these data are incompatible are varied, and include, but are not limited to, incompatible naming structures, incompatible data structures, incompatible system requirement, et al. Kindred registry data 306, however, is defined as registry data that can be used by either the old or new software package, even though they may not exist in a same format. Thus, while there may be a need to translate kindred registry data 306 from one format to another before being shared by a old version software package and the new version software package, the data itself in the kindred registry data 306 can be utilized by either the old or new software package. Note that kindred registry data 306 may actually change during the upgrade migration process (as suggested by the change in labeling from 306a to 306b), or the kindred registry data 306a may be identical to kindred registry data 306b.

When a client (computer) 104 needs a registry file, the kindred registry data 306, as well as the appropriate new or old registry data, is downloaded to that client. For example, assume that client 104a is running an old version software package. When the registry file for that old version software package is requested, the server 102 downloads a "downgrade" version of the registry file, which includes the kindred registry data 306b and the old registry data 302. Since the new registry data 310 is not sent to client 104a, then there is no conflict between the old registry data 302 and the new registry data 310 at runtime (when the client 104a runs the old version software package). Similarly, when client 104b, which will run the new version software package, requests the needed registry file for the new version software package, then only the kindred registry data 306b and the new registry data 310 is downloaded (in a normal usage manner) to client 104b. Note that client 104b may later download old registry data 302 and kindred registry data 306b if needed, assuming that old registry data 302 and new registry data 310 are not mixed together (such as by deleting any new registry data 310 that is still on client 104b).

Figure 3B:
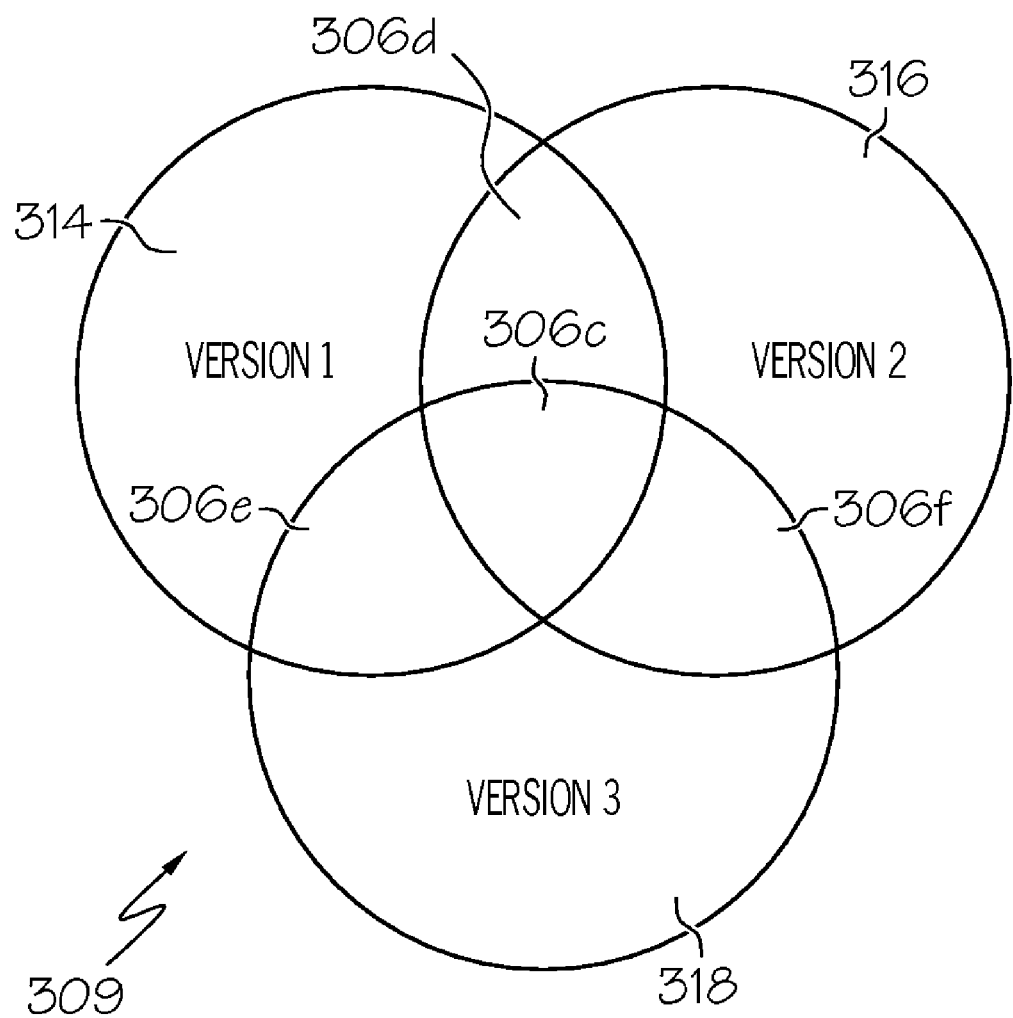

Thus, a principal concept of the present invention is that prior versions of registry data can be grouped into a superset registry file 311 that is embedded with an FTO 308. The number of prior versions of registry data are not limited to the two shown in FIG. 3A. For example, as shown in FIG. 3B, a superset registry file 309 includes a kindred registry data 306c, which is compatible with three versions (versions 1-3) of registry data. Version 1 includes exclusive version 1 registry data 314, which is usable only by version 1 and is incompatible with the other two versions. Similarly, version 2 has exclusive version 2 registry data 316 and version 3 has exclusive version 3 registry data 318. Between version 1 and version 2, there is also a kindred registry data 306d, which can be used together with exclusive version 1 registry data 314 and exclusive version 2 registry data 316, but not with exclusive version 3 registry data 318. Similarly, between version 2 and version 3, there is also a kindred registry data 306f, which can be used together with exclusive version 2 registry data 316 and exclusive version 3 registry data 318, but not with exclusive version 1 registry data 314; and between version 1 and version 3, there is also a kindred registry data 306e, which can be used together with exclusive version 1 registry data 314 and exclusive version 3 registry data 318, but not with exclusive version 2 registry data 316. Furthermore, even more versions (exceeding three in number) of registry data can be combined in a superset registry file, which preferably has an embedded FTO, in a like manner as described herein.

Figure 3C:
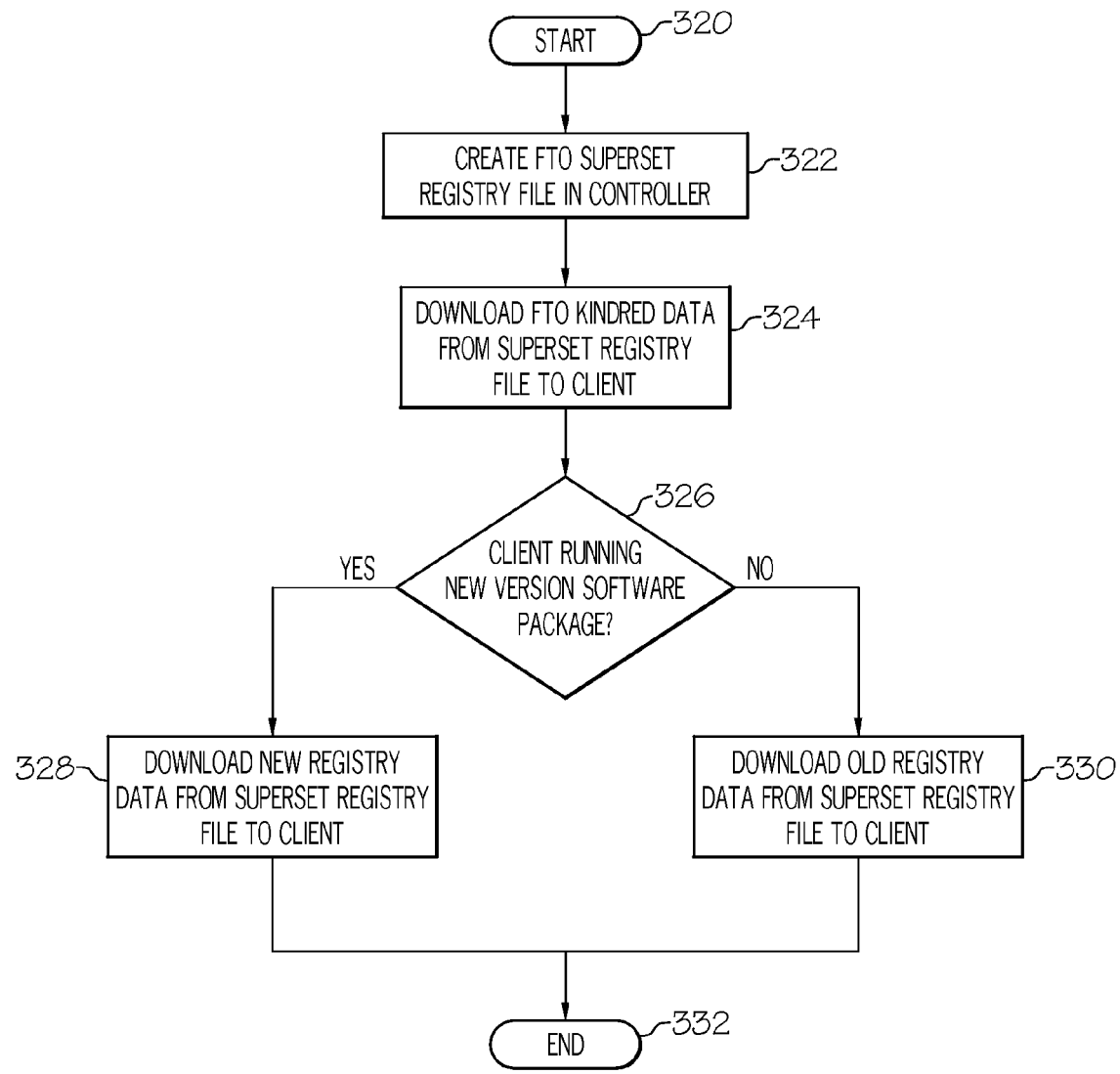
FIG. 3C is a flow-chart of exemplary steps taken to utilize the FTO to manage registry data.

Referring now to FIG. 3C, a flow-chart of exemplary steps taken by the present invention is presented. After initiator block 320, a superset registry file (with an embedded FTO as described above) is created, preferably in a controller, which may be in a server (block 322). No matter which software package version is being run in a client, kindred registry data can be used by the client, and thus is downloaded to any requesting client (block 324). In order to determine what other registry data can be used by the client, however, a query must be made to determine which software package version is being run (and thus which additional registry data is needed by the requesting client). This query is made of the client by the server (query block 326), and the new registry data (block 328) or old registry data (block 330) is downloaded, as appropriate. The process ends at terminator block 332.

Note that in the prior art, upgrades to registry files were irreversible. However, as described in the current invention, upgrades are reversible. A preferred method of providing this reversibility is shown in the pseudocode shown in FIG. 4. When the registry file for WAS.xml is upgraded from Version 5 to Version 6, a new section of FTO code, starting with <FTO from="6" to="5"> and ending at </FTO>, is added. If the client is using Version 6, then the FTO code is simply ignored, since the registry data ("provider") is correct. However, if the client is using Version 5, then the FTO code is run, thus re-instating registry data for "keyFileName."

Figure 4:
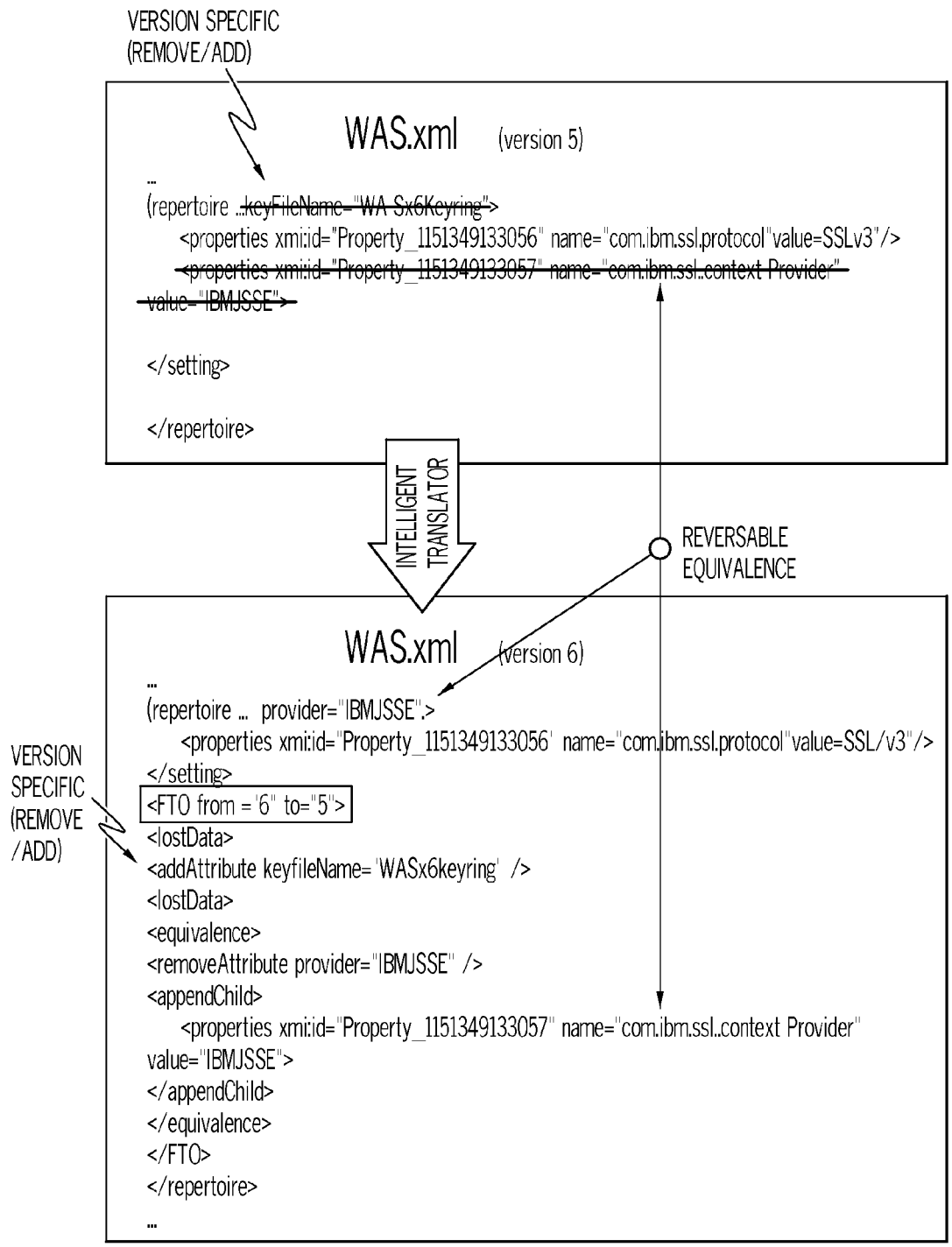
FIG. 4 depicts exemplary FTO pseudocode used to enable steps described in FIG. 3C.
Figure 5:
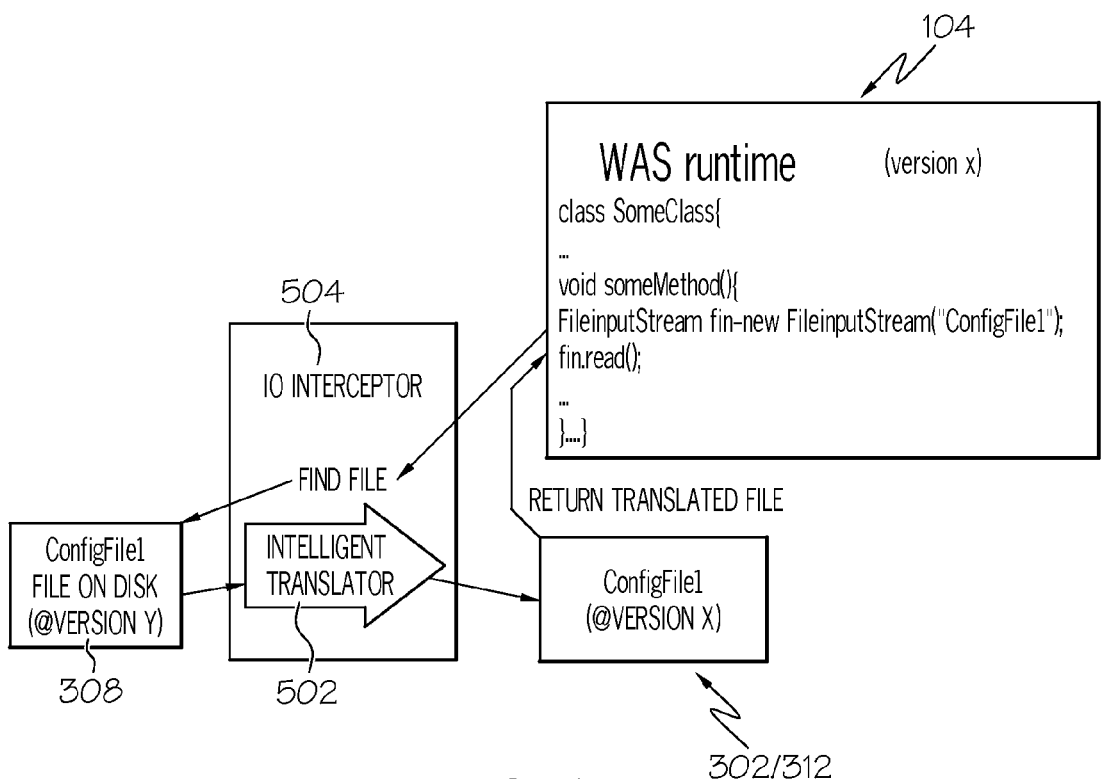
FIG. 5 illustrates an Input/Output (IO) Interceptor that manages use of the FTO.

As suggested by FIG. 4, translation actions are inserted between reading a file and using a file. Thus, the client (during runtime) need never know about new versions of a registry file, due to the flexibility offered by the described FTO code. Thus, as shown in FIG. 5, consider ConfigFile1 (@versionY), which in an exemplary manner, is an FTO 308 described above. ConfigFile1 (@version Y) is sent to an Intelligent Translator 502, which is part of an 10 Interceptor 504, which may be part of software shown in FIG. 2 as RMP 248. The Intelligent Translator 502 queries ConfigFile1 (@version X), which is equivalent to registry files 302/312 described above, to determine which version registry files are needed by the client. This information is sent to the runtime environment of the Application Server (e.g., software deploying server 202 shown in FIG. 2), which then sends a request back through the IO Interceptor 504 to the FTO 308, which sends the appropriate version registry file (302 or 312) to the client.

Figure 6:
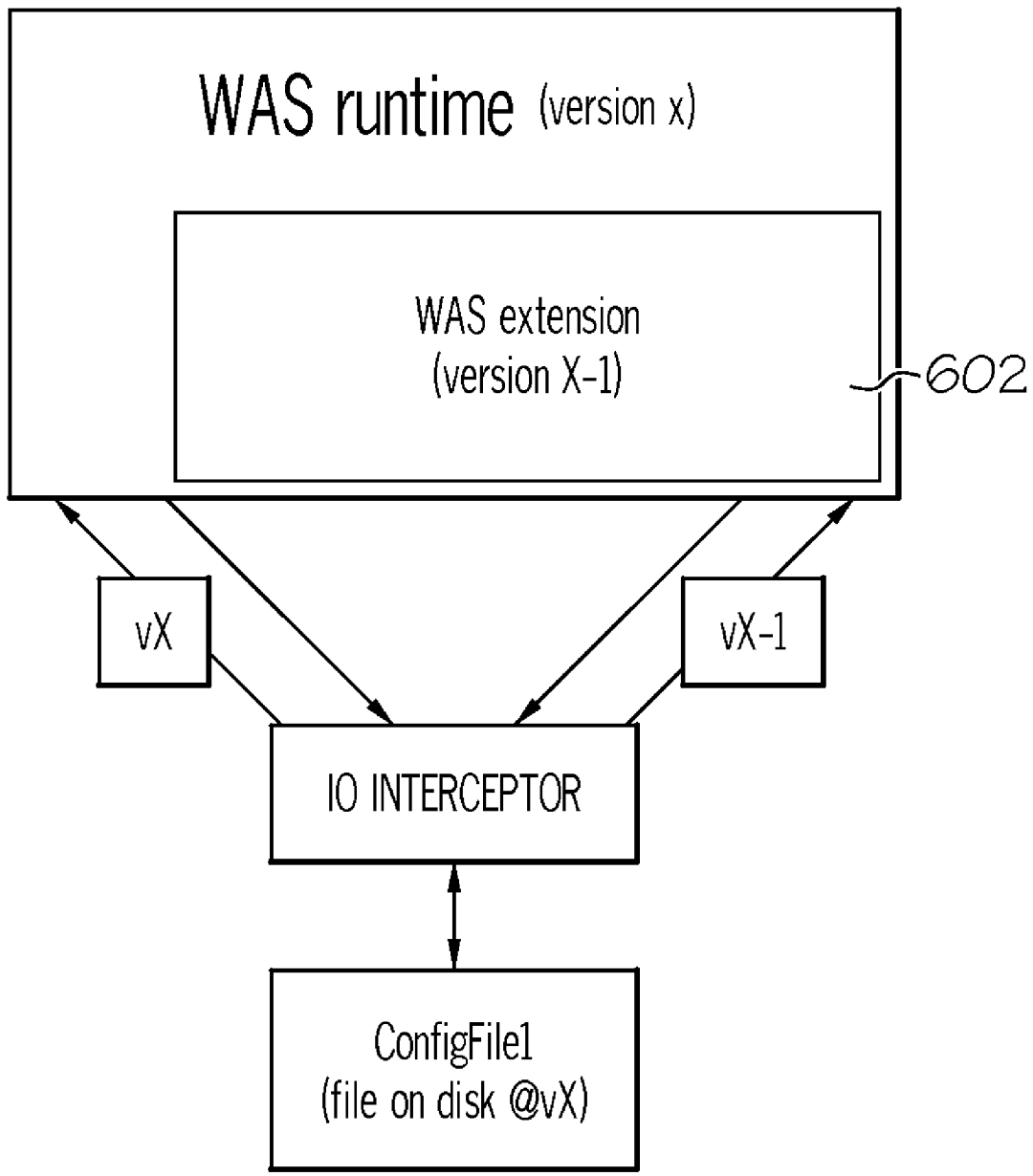
FIG. 6 depicts an environment in which an extension software is dependent on a specific version of runtime support software.

Oftentimes, the reason that a client needs a prior version of registry data is that the client is trying to run a portal or similar extension application, which must run under a specific environment (software version) in the application server. Thus, as shown in FIG. 6, to determine which registry version matches the extension application, IO interceptor 504, queries the extension application 602 (which may be a portal application running under a version X-1 of the WAS runtime program). Since the extension application 602 requires registry file 302 to properly run, then that is the registry file that is pulled from FTO 308 (ConfigFile1 (file on disk@vX)).

Many application servers only support legacy operations that go back for a couple of versions. Thus, the FTO code running through the IO interceptor must be updated. For example, as shown by the pseudocode in FIG. 7, assume that only the current and past two versions of the configuration file are supported by the software deploying server. As such, then FTO code for earlier versions must be removed, either automatically using code not shown, or manually by a software manager, as depicted.

As noted above, it is to be understood that at least some aspects of the present invention may alternatively be implemented in a computer-useable medium that contains a program product. Programs defining functions on the present invention can be delivered to a data storage system or a computer system via a variety of signal-bearing media, which include, without limitation, non-writable storage media (e.g., CD-ROM), writable storage media (e.g., hard disk drive, read/write CD ROM, optical media), and communication media, such as computer and telephone networks including Ethernet, the Internet, wireless networks, and like network systems. It should be understood, therefore, that such signal-bearing media, including but not limited to tangible computer-readable media, when carrying or encoded with a computer program having computer readable instructions that direct method functions in the present invention, represent alternative embodiments of the present invention. Further, it is understood that the present invention may be implemented by a system having means in the form of hardware, software, or a combination of software and hardware as described herein or their equivalent.

Thus, in one embodiment, the present invention may be implemented through the use of a computer-readable medium encoded with a computer program that, when executed, performs the inventive steps described and claimed herein.

Reversibility of Registry File Translation

As stated herein, prior art translation solutions are one time conversions, and thus "dispose" of data that has no significance to the destination version, and "destructively mutate" data that has significance such that it may be unusable by the source version. Conversely, the present invention moves data set translation actions to map the source set to a destination set, thus providing for returnable mapping by forcing the configurations to be mappable ring sets (i.e., closed and complete across the map/translation). In one embodiment, the configuration forcing is accomplished through the addition of an FTO tag in an XML document that is ignorable during runtime parsing, and contains all data that would have otherwise been lost or destroyed during translation. A version specific form of this FTO tag exists in all document versions and contains any data that is not applicable to or mutated in the document data version.

The conversion between ring sets also allows for a non-generalized object. Once the mapping is created, any version of the set can be converted to any other version directly or linearly as desired by the implementers without the need to create and then translate through a "master" document set.

A translation document, such as an Extensible Stylesheet Language Transformation (XSLT), may be written for each version translation, contrary to prior art solutions that implement only one direction of translation, which is destructive. A minimum set of translation documents is a set of bidirectional N to N+1 documents. These translations can be chained so that only one translation document per document version level need exist.

Note that FTO information is not important to the version of the file that it is in rather it is specifically used to convert the file into another version (or the residual archive from a translation).

Runtime Detachment (Plugability)

Note also that translation actions are inserted between reading the file and using the file. Therefore, the runtime need never be made aware of the version of the file, nor does logic need exist in the runtime product to deal with multiple versions. Rather, an Input/Output (IO) is subclassed/intercepted and a version request is added. Then the delivered stream contains the document from the source translated to the requested version. Save actions are also intercepted and optionally translated based on pluggable rules for the implementation of this idea. Exemplary options are: always store at the latest version; always store at the files existing version; always store the data in the version provided by the save requester, etc.

A pluggable interface can be used to allow multiple products, files, etc to tie in, so that each time they perform an IO, the translation automatically occurs. This automatic translation can be bidirectional based on configuration information. Therefore, once translated to a "most recent" release, all data is stored on the file system in the "most recent" release, and each access to the document (by something requiring an older release) results in a translation backward. A different option allows for the file versions on the system to remain at the version they originally were written at, so each access by a newer release would result in a translation. Thus, an IO interceptor can hide the translation data (store it in memory but do not include it in the file delivered to the software runtime) from the requesting program, such that any given version does not see any "extra" data that is used only for translation. However, a more robust solution according to the present invention has the runtime correctly ignore any translation data.

Multiversion Active Sharing (Backlevel Extension Support)

Runtimes can be setup to allow each component to request files at a custom version. This allows for extendable software that provides backwards compatibility (such as supported by IBM's WebSphere®), to run loose to medium coupled extensions originally written on older releases. This setup allows for seamless connection between versions of WebSphere® or stack products. In addition to connecting the translation to file 10, the setup version can also be connected to network 10, so that a document from runtime that is turned into any standard XML format would be able to be translated by this plug-in before being sent across the wire.

Cleaning House: (Dealing with Translation Information that is no Longer Desired)

After several release translations there is a potential for lots of translation data. If the customer/user decided that they never want to go back to a certain level (such as never convert back to version x+2 from version x+5) then the translation data for those affected translations can be removed. However, at that point the user has decided to limit the flexibility of the file to better suit the user's needs.

The present invention thus provides for a method, system, and computer-readable medium for sharing kindred registry data between an older version of a configuration file and a newer version of a configuration file. In a preferred embodiment, the method includes the steps of: creating, in a controller, a superset registry file that includes a Flexible Transformation Object (FTO), wherein the superset registry file includes old registry data, new registry data, and kindred registry data, wherein the old registry data and the new registry data are incompatible, and wherein the kindred registry data is compatible with both the old registry data and the new registry data; and contemporaneously downloading the kindred registry data and software version-specific registry data, selected from the old registry data and the new registry data, to a requesting client. The FTO is a software object that includes information that is used by an intelligent translator to convert the superset registry file into a single complete registry file that contains only the old registry data and the kindred registry data, or alternatively, only the new registry data and the kindred registry data. In one embodiment, the requesting client is contemporaneously requesting an old version software package that is supported by the old registry data and the kindred registry data.

The method may further include the step of downloading the old registry data to the requesting client. In one embodiment, the kindred registry data has been modified since the old registry data was initially created; the requesting client has access to only an original format object, and wherein the requesting client is unaware of the new registry data; and the requesting client is contemporaneously requesting a new version software package that is supported by the new registry data and the kindred registry data. In one embodiment, an extension product must run within a framework that utilizes an appropriate version of a software package, and the method further comprises the step of, in response to the requesting client being unable to utilize an extension product due to an inappropriate version of a software package being run within the requesting client, downloading the appropriate version of the software package and an appropriate version of registry data from the superset registry file from the server to the requesting client.

The method may further include the step, in which the older version of the configuration file and the newer version of the configuration file utilize different data formats, of translating the kindred registry data into a data format utilized by a requesting client's configuration file. Furthermore, the method may include the step of making changes to the kindred registry data, wherein the changes to the kindred registry data are specific for a newer version software package that is used by the requesting client, and wherein the requesting client is able to view changes to the kindred registry data regardless of which version software package is in use by the requesting client. Note that software to execute the described and claimed steps may be deployed from a software deploying server in an on-demand basis.

While the invention has been particularly shown and described with reference to a preferred embodiment, it will be understood by those skilled in the art that various changes in form and detail may be made therein without departing from the spirit and scope of the invention.

What is claimed is:

1. A method for sharing registry data between an older version of a configuration file and a newer version of a configuration file, the method comprising:
    creating, in a controller, a superset registry file that includes old registry data of the older version of the configuration file, new registry data of the newer version of the configuration file, and a kindred registry data, wherein the older version of the configuration file and the newer version of the configuration file utilize different data formats, and wherein the old registry data and the new registry data are incompatible;
    contemporaneously downloading the kindred registry data to a requesting client, wherein the kindred registry data includes software version-specific registry data selected from the old registry data and the new registry data, and wherein the kindred registry data is compatible with both the old registry data and the new registry data; and
    making changes to the superset registry data, wherein the changes are specific for a newer version software package that is used by a requesting client, and wherein the requesting client is able to view changes to the superset registry data regardless of the requesting client using the newer version software package or a previous version software package.

2. The method of claim 1, wherein the requesting client is contemporaneously requesting the previous version software package that is supported by the old registry data and the kindred registry data.

3. The method of claim 2, further comprising downloading the old registry data to the requesting client.

4. The method of claim 1, wherein the kindred registry data has been modified since the old registry data was initially created.

5. The method of claim 1, wherein the requesting client has access to only an original format object, and wherein the requesting client is unaware of the new registry data.

6. The method of claim 1, wherein the requesting client is contemporaneously requesting the newer version software package that is supported by the new registry data and the kindred registry data.

7. The method of claim 1, wherein an extension product must run within a framework that utilizes an appropriate version of a software package, the method further comprising:
    in response to the requesting client being unable to utilize an extension product due to an inappropriate version of a software package being run within the requesting client, downloading the appropriate version of the software package and an appropriate version of registry data from the superset registry file from the server to the requesting client.

8. The method of claim 1, wherein the older version of the configuration file and the newer version of the configuration file utilize different data formats, and wherein the method further comprises:
    translating the kindred registry data into a data format utilized by a requesting client's configuration file.

9. The method of claim 1, wherein the superset registry file is embedded with a Flexible Transformation Object (FTO), wherein the FTO is a software object that includes information that is used by an intelligent translator to convert the superset registry file into a single complete registry file that contains only the old registry data and the kindred registry data.

10. The method of claim 1, wherein the superset registry file is embedded with a Flexible Transformation Object (FTO), wherein the FTO is a software object that includes information that is used by an intelligent translator to convert the superset registry file into a single complete registry file that contains only the new registry data and the kindred registry data.

11. A system comprising:
    a processor;
    a data bus coupled to the processor;
    a memory coupled to the data bus; and
    a computer-usable medium embodying computer program code, the computer program code comprising instructions executable by the processor and configured for:
        creating, in a controller, a superset registry file that includes old registry data of the older version of the configuration file, new registry data of the newer version of the configuration file, and a kindred registry data, wherein the older version of the configuration file and the newer version of the configuration file utilize different data formats, and wherein the old registry data and the new registry data are incompatible;

contemporaneously downloading the kindred registry data to a requesting client, wherein the new kindred registry data includes software version-specific registry data selected from the old registry data and the new registry data, and wherein the kindred registry data is compatible with both the old registry data and the new registry data; and making changes to the superset registry data, wherein the changes are specific for a newer version software package that is used by the requesting client, and wherein the requesting client is able to view changes to the superset registry data regardless of the requesting client using the newer version software package or a previous version software package.

12. The system of claim 11, wherein the instructions are further configured for:

the requesting client is contemporaneously requesting one of:

the previous version software package that is supported by the old registry data and the kindred registry data, wherein the kindred registry data has been modified since the old registry data was initially created, and the newer version software package that is supported by the new registry data and the kindred registry data; and translating the kindred registry data into a data format utilized by a requesting client's configuration file.

13. The system of claim 12, wherein the instructions are further configured for:

downloading the old registry data to the requesting client, wherein the older version of the configuration file and the newer version of the configuration file utilize different data formats and wherein the requesting client is unaware of the new registry data; and in response to the requesting client being unable to utilize an extension product due to an inappropriate version of a software package being run within the requesting client, downloading the appropriate version of the software package and an appropriate version of registry data from the superset registry file from the server to the requesting client, wherein the requesting client has access to only an original format object, and wherein an extension product must run within a framework that utilizes an appropriate version of a software package.

14. The system of claim 11, wherein the superset registry file is embedded with a Flexible Transformation Object (FTO), wherein the FTO is a software object that includes information that is used by an intelligent translator to convert the superset registry file into a single complete registry file that contains only one of: (a) the old registry data and the kindred registry data or (b) the new registry data and the kindred registry data.

15. A computer-readable storage medium embodying computer program code for sharing kindred registry data between an older version of a configuration file and a newer version of a configuration file, the computer program code comprising computer executable instructions configured for:

creating, in a controller, a superset registry file that includes old registry data of the older version of the configuration file, new registry data of the newer version of the configuration file, and a kindred registry data, wherein the older version of the configuration file and the newer version of the configuration file utilize different data formats, and wherein the old registry data and the new registry data are incompatible;

contemporaneously downloading the kindred registry data to a requesting client, wherein the new kindred registry data includes software version-specific registry data selected from the old registry data and the new registry data, and wherein the kindred registry data is compatible with both the old registry data and the new registry data; and making changes to the superset registry data, wherein the changes are specific for a newer version software package that is used by the requesting client, and wherein the requesting client is able to view changes to the superset registry data regardless of the requesting client using the newer version software package or a previous version software package.

16. The computer-readable storage medium of claim 15, wherein the computer executable instructions are further configured for:

the requesting client is contemporaneously requesting one of:

the previous version software package that is supported by the old registry data and the kindred registry data, wherein the kindred registry data has been modified since the old registry data was initially created, and the newer version software package that is supported by the new registry data and the kindred registry data; and translating the kindred registry data into a data format utilized by a requesting client's configuration file.

17. The computer-readable storage medium of claim 15, wherein the computer executable instructions are further configured for:

downloading the old registry data to the requesting client, wherein the older version of the configuration file and the newer version of the configuration file utilize different data formats, and wherein the requesting client is unaware of the new registry data; and in response to the requesting client being unable to utilize an extension product due to an inappropriate version of a software package being run within the requesting client, downloading the appropriate version of the software package and an appropriate version of registry data from the superset registry file from the server to the requesting client, wherein the requesting client has access to only an original format object, and wherein an extension product must run within a framework that utilizes an appropriate version of a software package.

18. The computer-readable storage medium of claim 15, wherein the computer executable instructions are deployable from a software deploying server to a client computer that is at a remote location.

19. The computer-readable storage medium of claim 15, wherein the computer executable instructions are provided by a software deploying server to a client computer in an on-demand basis.

20. The computer-readable storage medium of claim 15, wherein the superset registry file is embedded with a Flexible Transformation Object (FTO), wherein the FTO is a software object that includes information that is used by an intelligent translator to convert the superset registry file into a single complete registry file that contains only one of (a) the old registry data and the kindred registry data or (b) the new registry data and the kindred registry data.

* * * * *